United States Patent
Kobayashi et al.

(10) Patent No.: US 6,898,039 B2
(45) Date of Patent: May 24, 2005

(54) POSITIONING CONTROL DEVICE FOR TWO-STAGE ACTUATOR

(75) Inventors: Masahito Kobayashi, Ushiku (JP);
Hidehiko Numasato, Odawara (JP);
Atsushi Okuyama, Chiyoda (JP)

(73) Assignee: Hitachi, Ltd., Tokyo (JP)

( * ) Notice: Subject to any disclaimer, the term of this patent is extended or adjusted under 35 U.S.C. 154(b) by 139 days.

(21) Appl. No.: 10/600,708

(22) Filed: Jun. 23, 2003

(65) Prior Publication Data

US 2004/0004781 A1 Jan. 8, 2004

(30) Foreign Application Priority Data

Jun. 24, 2002 (JP) ......................................... 2002-182324

(51) Int. Cl.$^7$ ............................................... G11B 19/04
(52) U.S. Cl. ..................... 360/60; 360/78.09; 360/77.04; 360/78.07
(58) Field of Search ............................... 369/44, 33, 43, 369/32, 25, 13; 360/60, 31, 78.07, 78.06, 77.04, 78.09, 78.05, 78.12

(56) References Cited

U.S. PATENT DOCUMENTS 6,674,605 B1 * 1/2004 Ell ........................... 360/78.05
2002/0176201 A1 * 11/2002 Hsin et al. ............... 360/78.05

* cited by examiner

*Primary Examiner*—Alan T. Faber
(74) *Attorney, Agent, or Firm*—Antonelli, Terry, Stout & Kraus, LLP

(57) ABSTRACT

In a positioning control device for a two-stage actuator having a coarse-movement actuator and a fine-movement actuator, a notch filter having a cutoff frequency fn is provided to a coarse-movement control loop, and the fine-movement actuator is driven by a sine wave of the frequency fn. At the frequency fn, a head position signal becomes identical with an output signal of the fine-movement actuator, by which the gain of the fine-movement actuator can be estimated by an adaptive identification unit with high accuracy based on the control input to the fine-movement actuator and the head position signal.

9 Claims, 9 Drawing Sheets

POSITIONING CONTROL DEVICE FOR TWO-STAGE ACTUATOR

BACKGROUND OF THE INVENTION

1. Field of the Invention

The present invention relates to disk storage drives such as magnetic disk units and optical disk units in which high-precision head positioning control is realized by letting a fine-movement actuator (of high response and short stroke) and a coarse-movement actuator (of low response and long stroke) operate in cooperation, and in particular, to positioning control technology for such a two-stage actuator by which input-output characteristics of the fine-movement actuator can be estimated and identified.

2. Description of the Related Art

A disk storage drive such as a magnetic disk unit is required to drive its head to a desired track of a disk by an actuator at high speed (seek control) and let the head stay on the desired track with high accuracy (following control) in order to realize high-speed access to information that has been recorded on the disk with high data density. To meet such requirements, it becomes necessary to reduce the weight of the actuator and widen the frequency band of the positioning control system. On the other hand, there is a certain limit to the increasing of resonance frequency of the actuator mechanism since weight reduction deteriorates the stiffness of the actuator, by which the frequency band of the positioning control system is necessitated to be restricted.

The track width of disks supported by existing magnetic disk units is approximately 0.5 $\mu$m, and positioning accuracy of the magnetic disk units is approximately 0.05 $\mu$m. Magnetic disk units of the future are required to deal with a track width of 0.2 $\mu$m or less, for which positioning accuracy of 0.02 $\mu$m or less is required to be attained. For such positioning accuracy, the frequency band of the positioning control system has to be widened from approximately 1 kHz of the present to 3 kHz or more. As a technique for widening the control frequency band, "two-stage actuator method" has become known, in which a coarse-movement actuator implemented by a voice coil motor is combined with a fine-movement actuator implemented by a piezoelectric element etc. and thereby the magnetic head is positioned with high accuracy. In general, the maximum driving voltage applied to the fine-movement actuator (piezoelectric element etc.) is approximately ±30 V, by which the head position changes approximately ±1 $\mu$m. However, the relationship between the driving voltage and the moving distance of the head (input-output characteristics of the actuator) varies due to variations in the manufacturing process of the piezoelectric elements, variation of the piezoelectric element with time, environmental conditions such as temperature and humidity, etc.

Meanwhile, a positioning control technique estimating the input-output characteristics of the fine-movement actuator has been disclosed in JP-A-2000-285621, for example.

The two-stage actuator is operated by two control inputs: a first input to the coarse-movement actuator and a second input to the fine-movement actuator. Meanwhile, a head position signal indicating the total moving distance of the head, obtained by adding the moving distance of the coarse-movement actuator to that of the fine-movement actuator, is outputted as an output signal. As a matter of fact, the deviation of the head moving distance from position information which has previously been recorded on the disk is detected and the deviation is outputted as the output signal, as will be described in detail. Therefore, the two-stage actuator as a controlled system is a two-input one-output system, and some contrivance becomes necessary for realizing the estimation of the input-output characteristics of the fine-movement actuator. As for the coarse-movement actuator, its input-output characteristics (gain) can be estimated easily using conventional identification methods, by interrupting the driving voltage to the fine-movement actuator and letting the coarse-movement actuator operate alone (letting the two-stage actuator operate as a one-input one-output system). On the other hand, for the estimation of the input-output characteristics of the fine-movement actuator, it is difficult to let the fine-movement actuator operate alone for the positioning without letting the coarse-movement actuator operate, since the stroke of the fine-movement actuator is too small relative to various external perturbations to the actuator. Therefore, only the total moving distance of the coarse-movement actuator and the fine-movement actuator can be observed and obtained from the head position signal as the output of the actuator.

In the aforementioned JP-A-2000-285621, a method for estimating the gain of the fine-movement actuator has been proposed. In the method, the gain of an error rejection rate (sensitivity function) of the coarse-movement actuator at a specific frequency is measured first. Subsequently, the gain of the fine-movement actuator is estimated by actually measuring a gain of the fine-movement actuator (regarding its driving input signal and the head position signal) at the aforementioned specific frequency and multiplying the measured gain by the gain of the error compression rate of the coarse-movement actuator. The method, requiring two measurement steps for the estimation and employing a Fourier-transform technique for the gain estimation, involved problems with estimation time and estimation accuracy. Further, an external perturbation signal like a sine wave has to be applied to the fine-movement actuator for the estimation, during which data reading/writing by the head becomes impossible. To sum up, various problems remain to be solved for the estimation of the input-output characteristics of the fine-movement actuator.

BRIEF SUMMARY OF THE INVENTION

It is therefore the primary object of the present invention to realize a positioning control device including adaptive identification means capable of estimating the input-output characteristics of the fine-movement actuator at high speed and with high accuracy.

Another object of the present invention is to realize a positioning control device including adaptive identification means capable of estimating the input-output characteristics of the fine-movement actuator and detecting its gain deterioration etc. even in the midst of data reading/writing by the head.

In accordance with a first aspect of the present invention, there is provided a positioning control device for a two-stage actuator having a fine-movement actuator for supporting and positioning a head which reads or writes information from/to a disk and a coarse-movement actuator for positioning the fine-movement actuator which is mounted thereon, comprising coarse-movement control means which controls the coarse-movement actuator based on a head position signal (head position information) which is obtained from information read out by the head. The positioning control device further comprises: a notch filter having a cutoff frequency fn which is provided to the coarse-movement control means; target value generation means which outputs instruction values for driving the fine-movement actuator at the frequency fn; and adaptive identification means which estimates the gain of the fine-movement actuator from a control input signal to the fine-movement actuator and the head position signal.

Preferably, the adaptive identification means is implemented by: an identification model indicating characteristics of the fine-movement actuator; a variable gain indicating gain of the fine-movement actuator to be estimated; an identification model output signal as the product of the identification model and the variable gain; and adaptive control means which controls the variable gain so as to reduce the deviation of the identification model output signal from the head position signal.

In the above composition, the instruction values for driving the fine-movement actuator at the frequency fn are suitably implemented by target values forming a sine wave.

In accordance with a second aspect of the present invention, in a positioning control device for a two-stage actuator having a fine-movement actuator for supporting and positioning a head which reads or writes information from/to a disk and a coarse-movement actuator for positioning the fine-movement actuator which is mounted thereon, comprising coarse-movement control means which controls the coarse-movement actuator based on a head position signal which is obtained from information read out by the head, the gain of the fine-movement actuator is estimated from an actuating signal to the fine-movement actuator and the head position signal in a state in which a response waveform of the head position signal coincides with a response waveform of the fine-movement actuator.

In accordance with a third aspect of the present invention, there is provided a positioning control device for a two-stage actuator having a fine-movement actuator for supporting and positioning a head which reads or writes information from/to a disk and a coarse-movement actuator for positioning the fine-movement actuator which is mounted thereon, comprising control means which controls the fine-movement actuator and the coarse-movement actuator based on head position information which is read out by the head. The positioning control device further comprises adaptive identification means which employs: a coarse-movement identification model for estimating the position of the coarse-movement actuator based on control input to the coarse-movement actuator and a model of the coarse-movement actuator; and an estimated position signal regarding the fine-movement actuator that is obtained by subtracting the output of the coarse-movement identification model from the head position information, and thereby estimates the gain of the fine-movement actuator from control input to the fine-movement actuator and the estimated position signal regarding the fine-movement actuator.

Preferably, the information writing to the disk by the head is prohibited if the gain of the fine-movement actuator estimated by the adaptive identification means became lower than a preset value.

Preferably, control means for the fine-movement actuator is adjusted based on the gain of the fine-movement actuator estimated by the adaptive identification means.

By the present invention, the controller of the fine-movement actuator can be adjusted or redesigned properly based on the gain of the fine-movement actuator estimated with high accuracy, by which high-precision head positioning control can be attained. The high-precision positioning control allows smaller track width (track interval) and higher data density per disk surface, thereby higher storage capacity of the disk storage drive can be realized. Further, since the gain deterioration of the fine-movement actuator can be detected, necessary action or steps can be taken properly and immediately and thereby the reliability of the device can be increased.

BRIEF DESCRIPTION OF THE SEVERAL VIEWS OF THE DRAWINGS

The objects and features of the present invention will become more apparent from the consideration of the following detailed description taken in conjunction with the accompanying drawings, in which.

DETAILED DESCRIPTION OF THE INVENTION

Figure 1:
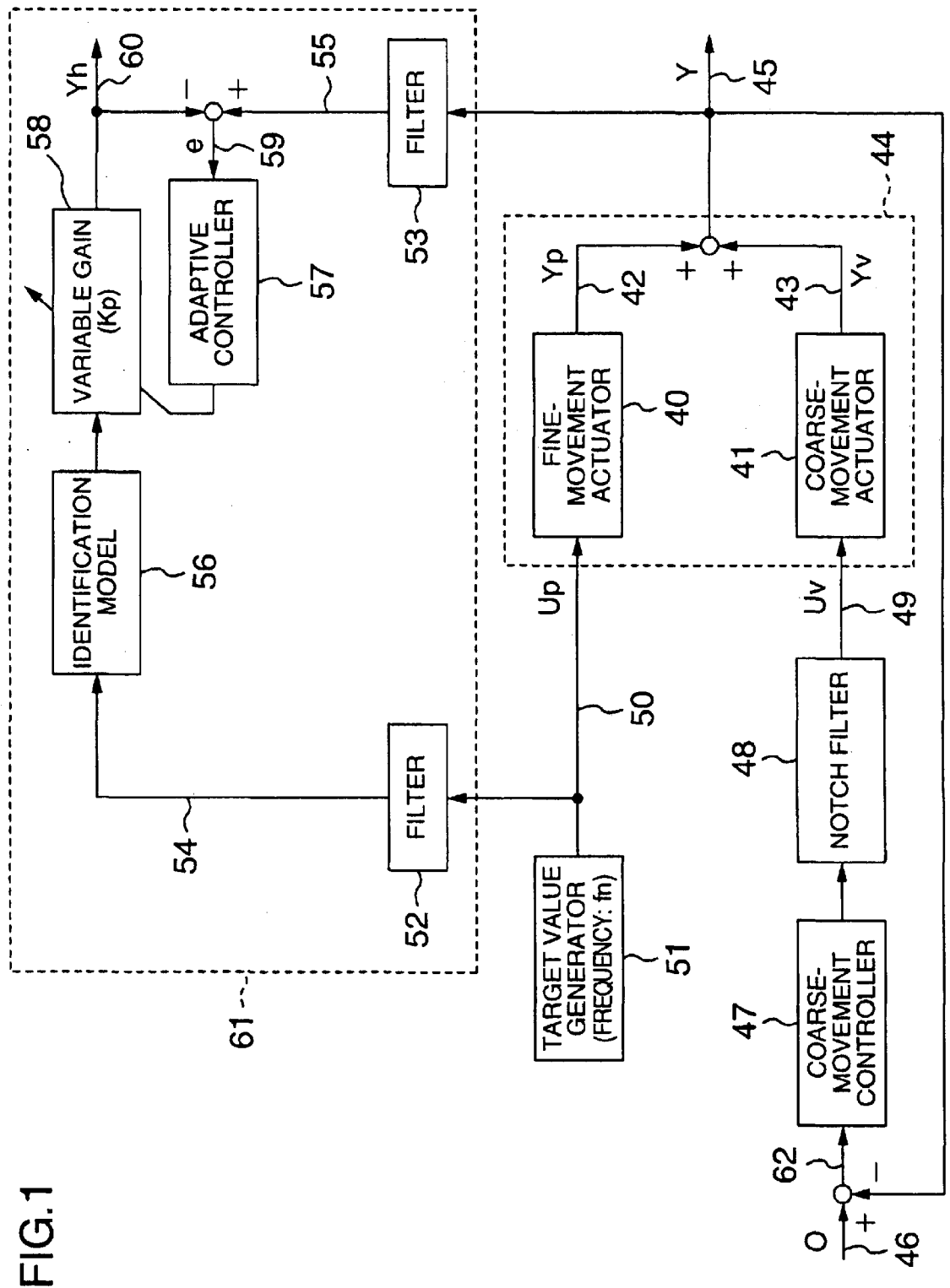
FIG. 1 is a block diagram showing a positioning control device in accordance with a first embodiment of the present invention.

Referring now to the drawings, a description will be given in detail of preferred embodiments in accordance with the present invention.

In consideration of the fact that the two-stage actuator as a controlled system is a two-input one-output system, the present inventors invented a method for eliminating the moving distance of the coarse-movement actuator from the head position signal (output signal) at a specific frequency. By the method, it becomes possible to correctly estimate the input-output characteristics of the fine-movement actuator based on its driving input signal and the head position signal. The first invention will be described first referring to FIGS. 1 through 6B as a first embodiment of the present invention. Following the above invention, the present inventors invented a concrete method for correctly estimating the input-output characteristics of the fine-movement actuator based on the control input signal of the fine-movement actuator and the head position signal. In the method, the input-output characteristics of the fine-movement actuator is estimated by using a model of the coarse-movement actuator and subtracting the moving distance of the coarse-movement actuator from the head position signal (output signal). The second invention will be described next referring to FIGS. 7 and 8 as a second embodiment of the present invention.

FIG. 1 is a block diagram showing a following control system as a positioning control device in accordance with the first embodiment of the present invention. The two-stage actuator as a controlled system includes two actuators: a coarse-movement actuator 41 and a fine-movement actuator 40. The control inputs to the coarse-movement actuator and the fine-movement actuator will hereafter be expressed as Uv: 49 and Up: 50, respectively. The moving distances of the coarse-movement actuator and the fine-movement actuator will be expressed as Yv: 43 and Yp: 42. The moving distance of the head (head position), an amount that can actually be observed, will be expressed as Y: 45 (=Yv+Yp). It is obvious from the above definitions that the two-stage actuator as the controlled system is a two-input one-output system.

The positioning of the coarse-movement actuator is conducted by an ordinary coarse-movement controller 47 that is commonly used for the following control. The coarse-movement controller is composed of, for example, a PI-Lead filter, a notch filter (suppressing the gain of mechanism resonance), etc. In this embodiment, another notch filter 48 having a cutoff frequency fn is inserted in the coarse-movement actuator loop. The notch filter has a function of removing signal components of frequency fn from the coarse-movement loop. This means that all the components of the observed head position Y with the frequency fn come from the output Yp of the fine-movement actuator. Under the conditions, the fine-movement actuator is driven by a target value generator 51 which generates, for example, a sine wave (frequency: fn). As the control input Up to the fine-movement actuator, a control input signal having the frequency fn and an amplitude An is applied. By the application of the control input Up, the fine-movement actuator moves like a sine wave (harmonic oscillation) with the frequency fn, an amplitude Bn, and a phase delay corresponding to phase delay characteristics of the fine-movement actuator at the frequency fn. The head position signal Y, the one and only signal that is actually observable, is fed back to the coarse-movement controller. A target value 46 supplied to the feedback loop is set to zero in this example.

The frequency band of open loop characteristics of the product of the coarse-movement actuator 41 and the coarse-movement controller 47 (zero cross frequency) is approximately 1 kHz, therefore, the cutoff frequency of the notch filter 48 has to be set properly from the viewpoint of the stability of the coarse-movement loop. Since the notch filter delays the phase at frequencies lower than the cutoff frequency, there is a possibility that the phase margin decreases and the loop becomes unstable if the cutoff frequency is set lower than the frequency band (1 kHz). Therefore, the cutoff frequency fn of the notch filter is set to 2 kHz so as to be higher than the frequency band.

Figure 3A:
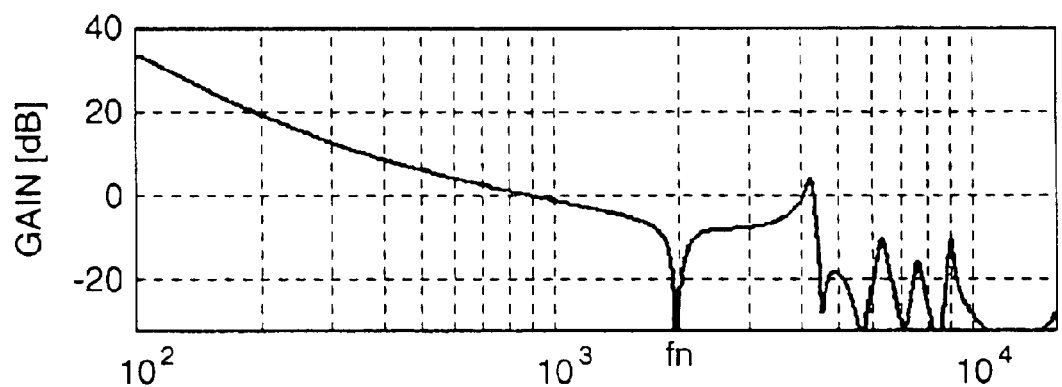
FIGS. 3A and 3B are graphs showing open loop characteristics of a coarse-movement loop in accordance with the first embodiment.
Figure 3B:
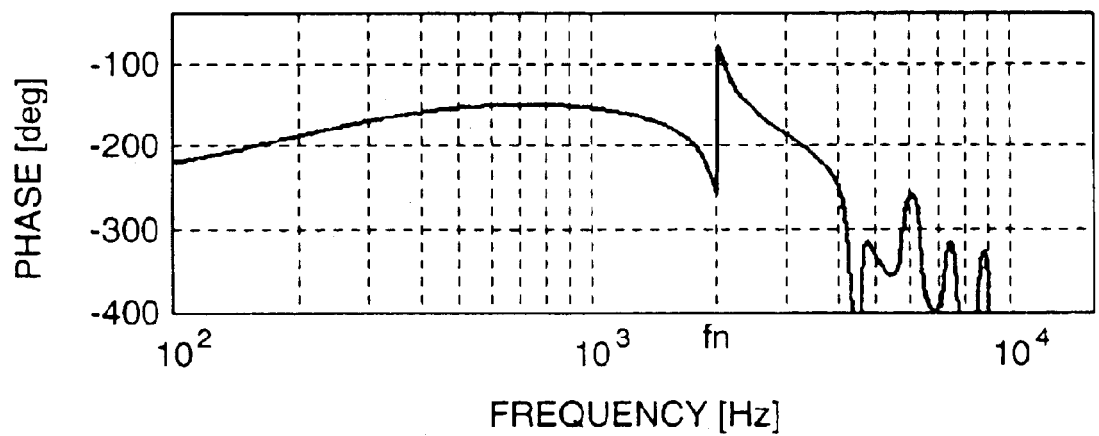
Figure 4A:
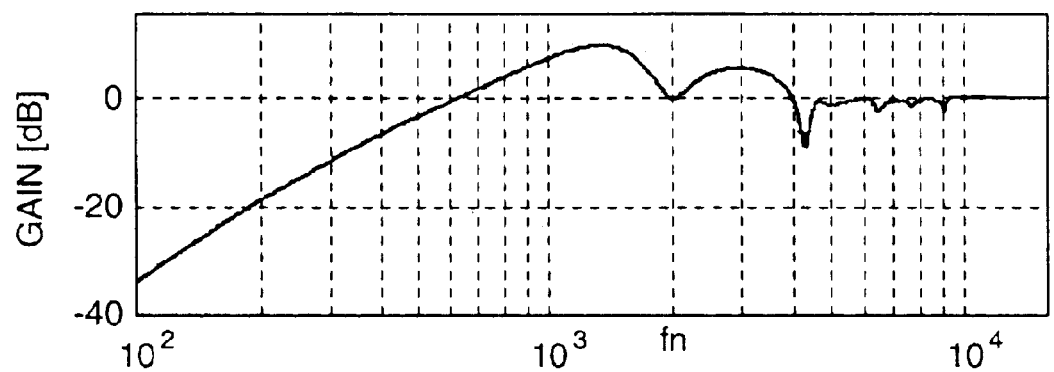
FIGS. 4A and 4B are graphs showing error rejection characteristics of the coarse-movement loop in accordance with the first embodiment.
Figure 4B:
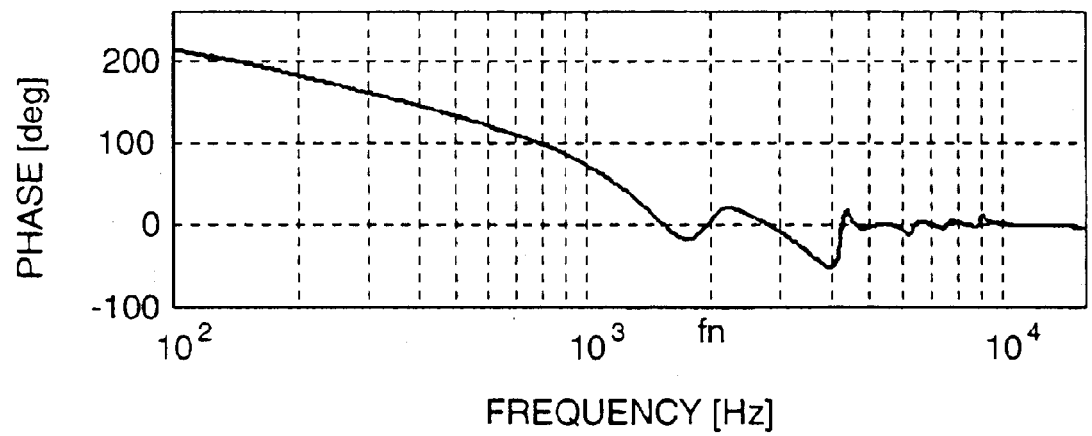

FIGS. 3A through 4B are graphs showing examples of the open loop characteristics and the error rejection characteristics (sensitivity function) of a coarse-movement loop which is designed as above. The open loop characteristics of FIGS. 3A and 3B show the characteristics of part of FIG. 1 from a deviation 62 to the output Yv of the coarse-movement actuator, in which stable characteristics can be seen in the 1 kHz frequency band with a phase margin of 30 degrees and the gain is reduced (cur off) at the frequency fn due to the insertion of the notch filter. The error rejection characteristics of FIGS. 4A and 4B show the characteristics of part of FIG. 1 from the target value 46 to the feedback deviation 62.

The error rejection characteristics also indicates transfer characteristics of part of FIG. 1 from the output Yp: 42 of the fine-movement actuator to the head position signal Y: 45. In the prior art method, the gain of the fine-movement actuator was obtained by correcting the actually obtained gain characteristics of the fine-movement actuator by multiplying it by the error rejection characteristics. In the present invention, the gain of the error rejection characteristics becomes 0 at the frequency fn, at which the phase of the error rejection characteristics also becomes 0, as shown in FIGS. 4A and 4B. In short, the results mean that the gain does not increase nor decrease and the phase lag/lead does not occur in the coarse-movement loop if the fine-movement actuator is driven at the frequency fn.

Figure 5A:
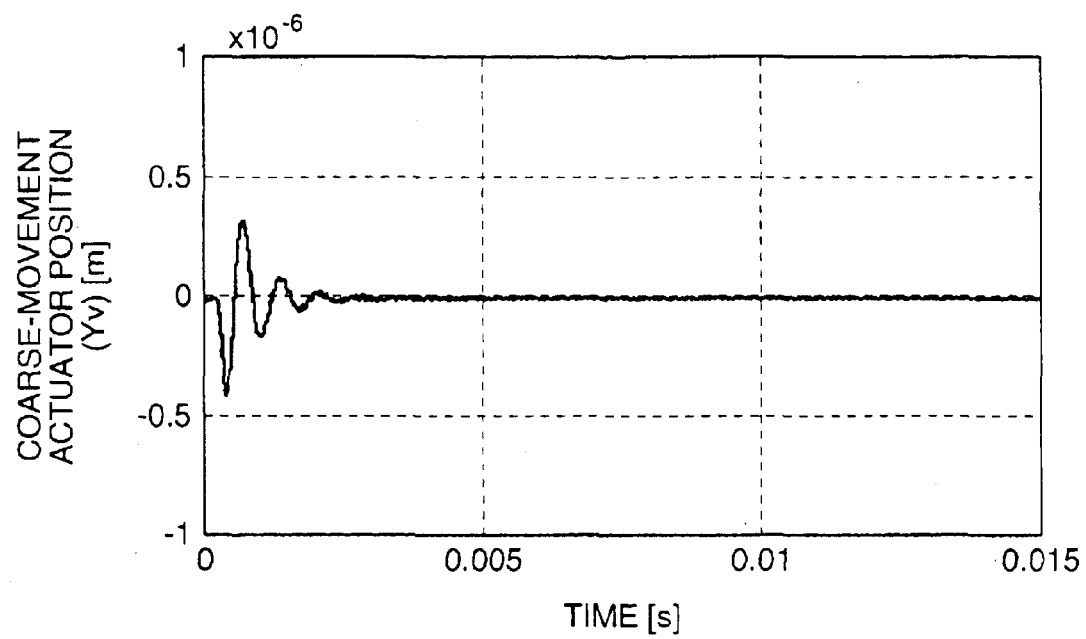
FIGS. 5A and 5B are graphs showing time response of the positions of a coarse-movement actuator and a fine-movement actuator in accordance with the first embodiment.
Figure 5B:
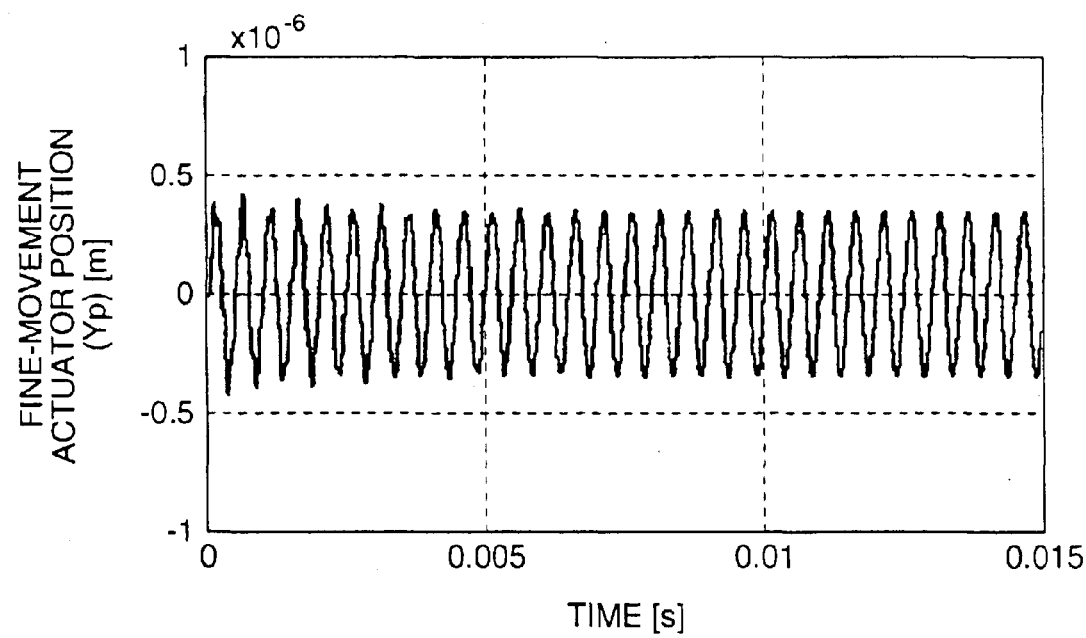
Figure 6A:
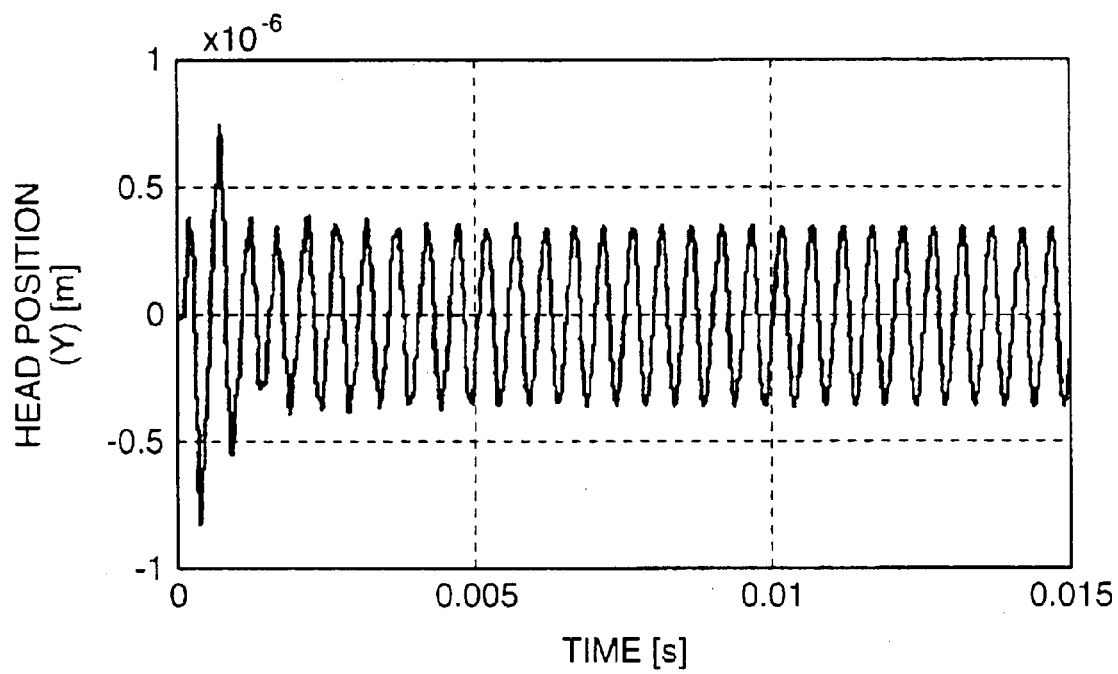
FIGS. 6A and 6B are graphs showing time response of head position and gain estimation result of the fine-movement actuator in accordance with the first embodiment.

The fact is explained more in detail referring to actual time response waveforms. FIGS. 5A and 5B are graphs showing the positions Yv and Yp of the coarse-movement actuator and the fine-movement actuator when a sine wave voltage signal (amplitude: ±10 V, frequency: 2 kHz) is applied to the fine-movement actuator. Although the coarse-movement actuator responds to the sine wave voltage signal until 0.003 sec due to transient characteristics (convergence of response) of the notch filter 48, the response thereafter converges on zero as shown in FIG. 5A. The fine-movement actuator, which moves ±1 $\mu$m by ±30 V, responds with an amplitude of ±0.33 $\mu$m in FIG. 5B. The head position signal Y observed in the above case is shown in FIG. 6A, in which the response of the head position signal Y perfectly coincides with that of the fine-movement actuator position Yp in FIG. 5B from 0.003 sec on.

Therefore, by the first embodiment, the input-output characteristics of the fine-movement actuator can be estimated from the control input to the fine-movement actuator and the head position signal by use of an identification device of some type, after the transient characteristics of the notch filter has converged on zero after the application of the sine wave to the fine-movement actuator is started.

Before a detailed explanation is given on an identification unit 61 shown in FIG. 1, hardware composition of a disk storage drive in accordance with the present invention will be explained referring to FIG. 2. A magnetic disk 2 is spun by a spindle motor 1 at a high and constant revolving speed. On the magnetic disk 2, position information 3 has preliminarily been recorded at the forefront of each sector of the each track. A magnetic head 4 which is placed to face the magnetic disk 2 reads/writes data from/to the magnetic disk 2. The magnetic head 4, supported by a spring 5, is driven by piezoelectric elements 6 and 7 that are supported by a carriage 8. In this embodiment, the explanation will be given assuming that the fine-movement actuator is composed of the piezoelectric elements. When the piezoelectric element 6 expands and the piezoelectric element 7 contracts, the magnetic head 4 moves slightly in a direction. On the other hand, when the piezoelectric element 6 contracts and the piezoelectric element 7 expands, the magnetic head 4 moves slightly in the opposite direction. The carriage 8 supporting the piezoelectric elements 6 and 7 is driven by a voice coil motor 10. According to the movement of the voice coil motor 10, the carriage 8 moves around a pivot 9 and thereby the magnetic head 4 moves toward the inner/outer radius of the magnetic disk 2. In this embodiment, the piezoelectric elements 6 and 7 are regarded as the fine-movement actuator, and the voice coil motor 10 is regarded as the coarse-movement actuator.

On the magnetic disk 2, the position information 3 is preliminarily recorded at preset time intervals Ts. As the position information 3, marker parts indicating the forefronts of sectors, AGC (Automatic Gain Control) pull-in parts, track numbers, and burst signals for the detection of relative positions are recorded. The magnetic head 4 detects the deviation of the head from the position information recorded on the disk surface at the time intervals Ts (sampling time). The deviation signal is amplified by a head amplifier 11, and a head position signal Y: 13 is generated by a position signal demodulation circuit 12 by use of the amplified deviation signal.

Figure 2:
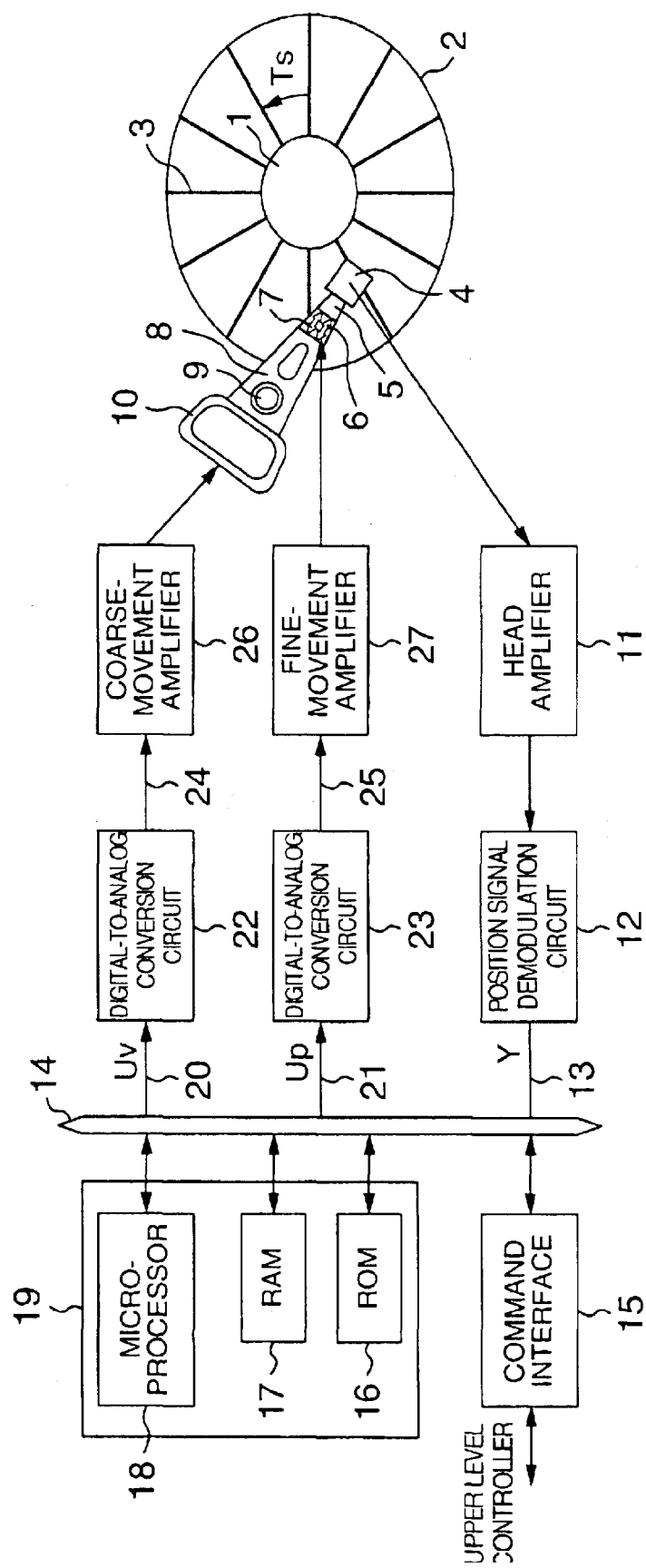
FIG. 2 is a schematic diagram showing hardware composition of a disk storage drive in accordance with the present invention.

The computations by the coarse-movement controller 47, the notch filter 48, the target value generator 51, and the identification unit 61 shown in FIG. 1 are carried out by a microprocessor system 19 in the hardware composition of FIG. 2. In the microprocessor system 19, a microprocessor 18 is connected to RAM (Random Access Memory) 17 and ROM (Read Only Memory) 16 by a bus line 14. The ROM stores programs for various control systems, etc. The RAM temporarily stores state variables of the control systems, variable gains, etc. The microprocessor carries out computations for the control systems and outputs the control inputs Uv: 20 (for driving the coarse-movement actuator) and Up: 21 (for driving the fine-movement actuator). The control inputs Uv: 20 and Up: 21 are converted from digital signals to analog signals by digital-to-analog conversion circuits 22 and 23 respectively, and the analog control inputs 24 and 25 are supplied to a coarse-movement amplifier 26 and fine-movement amplifier 27 respectively. By the outputs of the amplifiers 26 and 27, the voice coil motor 10 (coarse-movement actuator) and the piezoelectric elements 6 and 7 (fine-movement actuator) are driven, respectively. A command interface 15 shown in FIG. 2 receives various instructions from an upper level controller and transfers the instructions to the microprocessor 18.

In the following, the identification unit 61 shown in FIG. 1 will be explained in detail with reference to some mathematical expressions. In this example, the loop gain of the fine-movement actuator is estimated by use of a recursible least-squares method adaptive controller. Noise components are removed from the control input Up and the head position signal Y by use of the same filters 52 and 53. Band-pass filters transmitting the cutoff frequency fn only are suitable for the filters 52 and 53. Incidentally, the control input Up and the head position signal Y after the filtering will also be expressed by the same reference characters Up and Y for the sake of simplicity of notion. A discrete time model of the fine-movement actuator from the control input Up to the output Yp is expressed by the following equation (1), in which mechanism resonance of the fine-movement actuator is ignored, and a quadratic expression as the product of a linear Pade approximation of the calculation time delay and a first-order lag model of the amplifier is used:

$$Yp(k) = kp \frac{b_1 z + b_0}{z^2 + a_1 z + a_0} Up(k) \quad (1)$$

where k denotes a step number and z denotes a lead operator. The loop gain kp of the controlled system is composed of the gain of the digital-to-analog converter, the gain of the amplifier and the gain of the fine-movement actuator. How to estimate the loop gain kp will be explained below. The equation (1) can be rewritten as the following identification expression:

$$Yp(k) = kp(b_1 Up(k-1) + b_0 Up(k-2)) + \\ (-a_1 Yp(k-1) - a_0 Yp(k-2)) \\ = kp \cdot \xi(k) + \eta(k) \quad (2)$$

The goal is to estimate a variable gain kp(k): 58 as a good approximation (estimation) of the loop gain kp from Yp(k), ζ(k) and η(k). In this example, the estimation of kp is carried out by use of the recursible least-squares method. Incidentally, Yp(k) and the head position error Y(k) become equal to each other after a certain length of time as shown in FIGS. 5B and 6A. Therefore, kp can be estimated by use of the observable head position error signal Y(k). assuming Yp(k)=Y(k) in the above expression. For the identification expression (2), an identification model 56 is composed as:

$$Yh(k) = kp(k-1) \cdot \xi(k) + \eta(k) \quad (3)$$

and an identification error 59 is defined as:

$$e(k) = Yp(k) - Yh(k) \quad (4)$$

The adaptive controller 57 updates the variable gain kp(k) using the following algorithm:

$$kp(k) = kp(k-1) + \frac{\gamma(k-1) \cdot \xi(k)}{1 + \gamma(k-1) \cdot \xi(k)^2} e(k) \quad (5)$$

where γ(k) denotes learning gain, which is updated as:

$$\gamma(k) = \frac{\gamma(k-1)}{1 + \gamma(k-1) \cdot \xi(k)^2} \quad (6)$$

While the initial value of the estimate (variable gain) kp(k) can be set arbitrarily, it is set to zero in this example. The initial value of the learning gain γ(k) is set to approximately 100. Smaller initial values of the learning gain γ(k) lowers convergence speed although dispersion of the estimate can be reduced.

Figure 6B:
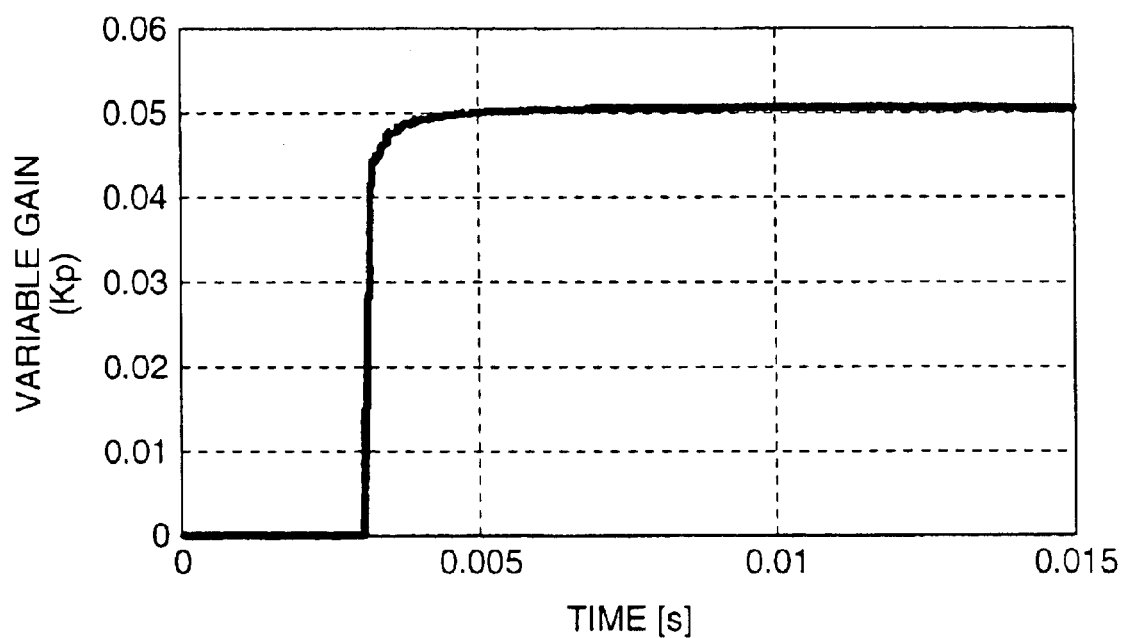

FIG. 6B is a graph showing the estimation result of the gain of the fine-movement actuator by use of the adaptive identification unit 61. The estimation was started at 0.003 sec. As shown in FIG. 6B, the estimate converged on a correct value 0.05 in as short as 0.0001 sec with high accuracy, by which the effectiveness of the present invention was ascertained. By use of the estimation result, the gains of a fine-movement controller 72 and a fine-movement model 71 can be adjusted. When the disk storage drive includes two or more heads whose positioning control is carried out by separate fine-movement actuators, the gain of each fine-movement actuator can be estimated by the above method. The estimation result can be preserved and used later even after the power is shut off, by storing the result in memory, a disk, etc. The above process can be conducted when the assembly of the disk storage drive is completed, during the manufacturing process, etc. It is also possible to let the user conduct the process after turning on the power of the disk storage drive. Further, the process can also be carried out during standby states of the disk storage drive in which no read/write instructions are supplied from the upper level host. However, the process in accordance with the first embodiment of the present invention can not be conducted in the midst of data reading/writing by the head, since the fine-movement actuator has to be driven by the sine wave signal without being controlled properly.

Incidentally, in some two-stage actuators having particular structure, there are cases where the output Yp: 42 of the fine-movement actuator can actually be measured. In such cases, the notch filter 48 shown in FIG. 1 becomes unnecessary and the gain of the fine-movement actuator can be estimated by the identification unit 61 based on the control input Up: 50 and the output Yp: 42 of the fine-movement actuator, letting the target value generator 51 generate a signal of an arbitrary frequency.

In the following, a second embodiment of the present invention will be explained referring to FIGS. 7 and 8. The notch filter 48 (inserted in the coarse-movement loop) and the target value generator 51 which were employed in the first embodiment of FIG. 1 are unnecessary in the second embodiment. In the positioning control device of FIG. 7, the gain of the fine-movement actuator is estimated in the midst of data reading/writing from/to the disk by the head, without the need of vibrating the fine-movement actuator by the sine wave etc. In the following, the design of a non-interacting two-stage actuator control system, in which a fine-movement controller 72 (controller for the fine-movement actuator) and a coarse-movement controller 47 (controller for the coarse-movement actuator) can be designed independently, will be described. Incidentally, the structure of the two-stage actuator is not particularly limited in the present invention.

The fine-movement actuator generally involves mechanism resonance at high frequencies around 10 kHz; however, its stable operation becomes possible if an integration-like property is provided to the fine-movement controller 72. Since the output of the fine-movement actuator can not be directly observed, the position of the fine-movement actuator is estimated using a model of the fine-movement actuator as an observer 71. The fine-movement actuator employing piezoelectric elements, from its input to output, can be approximated and regarded as a gain. Therefore, the output of the fine-movement controller multiplied by the gain of the fine-movement controller is regarded as the output of the fine-movement actuator, and the product is added by an adder 70 to a deviation signal which is supplied to the coarse-movement actuator. Feedback control by the coarse-movement controller is continued even after the deviation signal became zero due to the fine-movement actuator, so as to reduce the displacement of the fine-movement actuator. Since the fine-movement controller also operates according to the feedback control, the output of the fine-movement actuator decreases (maintaining the head position error signal at a target position) and eventually converges on zero, by which the fine-movement actuator can be held at the center of its movable range. By the control, the performance of the fine-movement actuator, whose stroke is restricted within a narrow range, can be unleashed to the fullest extent.

In the following, an adaptive identification unit 88 which is employed in the positioning control device of the second embodiment will be explained in detail. In the adaptive identification unit 88, noise components are removed from the control input Up: 73 of the fine-movement actuator, the head position signal Y: 45 and the control input Uv: 49 of the coarse-movement actuator by use of the same filters 74, 75 and 76. Incidentally, the control inputs Uv and Up and the head position signal Y after the filtering will also be expressed by the same reference characters Uv, Up and Y for the sake of simplicity of notion. The approach to the gain estimation of the fine-movement actuator employed in the second embodiment is similar to that in the first embodiment. As seen in FIG. 7, the observable response of the head position signal Y is composed of the response of the fine-movement actuator output signal Yp and the coarse-movement actuator output signal Yv added together. Therefore, in order to estimate the gain of the fine-movement actuator only, the output signal Yp of the fine-movement actuator has to be calculated. The output signal Yp can be calculated by subtracting the coarse-movement actuator output signal Yv: 30 from the observable head position signal Y: 45. Since the coarse-movement actuator output signal Yv can not be observed directly, the output (position) of the coarse-movement actuator is estimated (82) by use of a model 79 of the coarse-movement actuator. A coarse-movement actuator, which is generally composed of a voice coil motor and a carriage, has basic properties of a double integral system. The coarse-movement identification model 79 described in the discrete time expression is employed for the estimation. The accuracy of the model can be improved further by taking calculation time delay, higher-order mechanism resonance, etc. into consideration.

Figure 7:
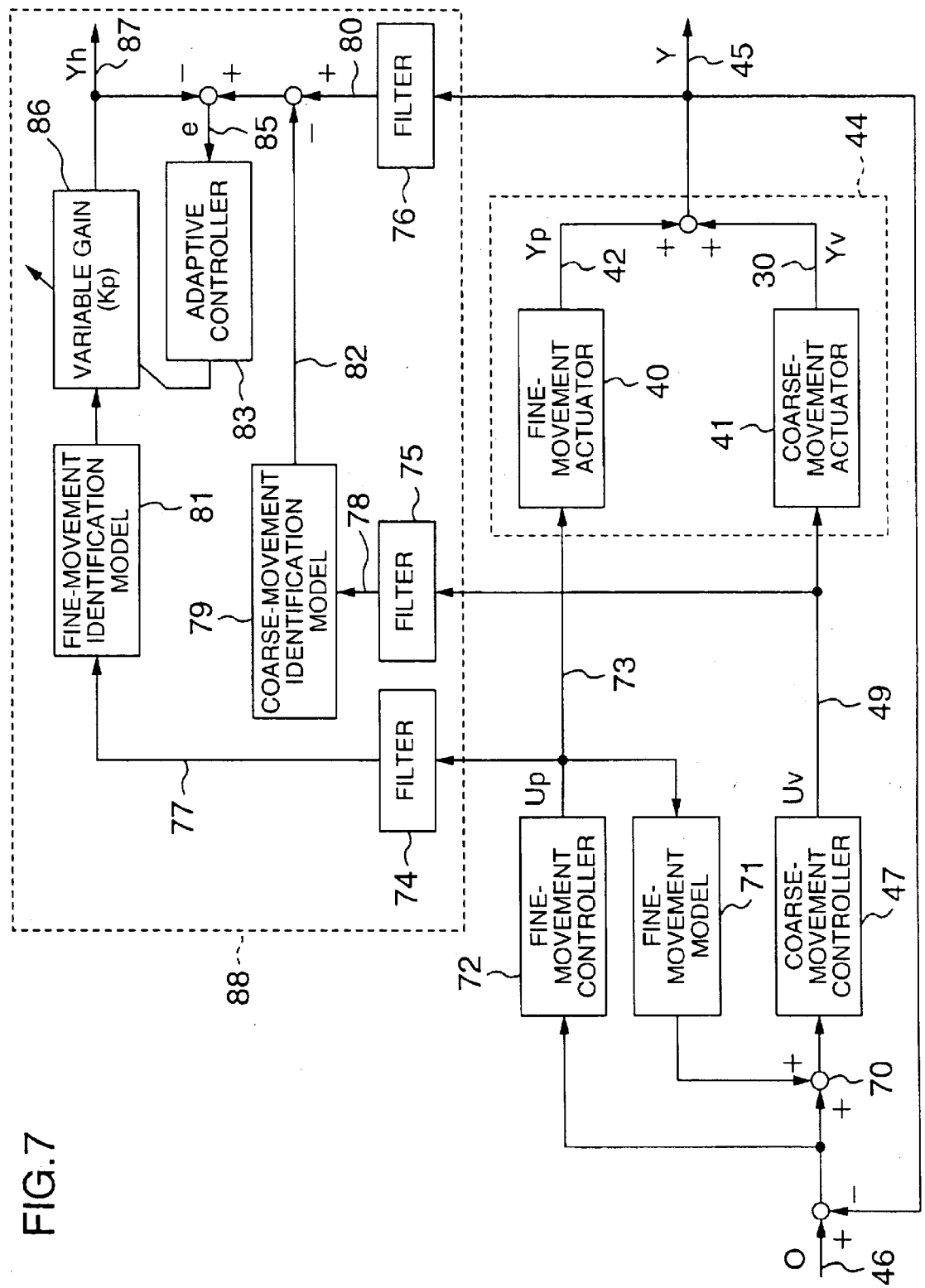
FIG. 7 is a block diagram showing a positioning control device in accordance with a second embodiment of the present invention.

A fine-movement identification model 81, a variable gain 86 of the fine-movement actuator to be estimated, and an adaptive controller 83 of the adaptive identification unit 88 shown in FIG. 7 can be implemented similarly to the identification model 56, the variable gain 58 and the adaptive controller 57 of the adaptive identification unit 61 of the first embodiment (by use of the equations (1) through (6)).

Incidentally, since the equations (5) and (6) are calculation algorithm of the sequential least-squares method (including division etc.), the load of calculation might multiply in the midst of data reading/writing from/to the disk. Therefore, an adaptive controller based on the gradient method (which requires less calculation load) will be described below. Since the goal is to minimize an error e: 85, an evaluation function J is defined as below:

$$J(k)=e^2(k) \qquad (7)$$

By use of partial differentiation of the above cost function J, an estimate equation of the variable gain kp: 86 is obtained as follows:

$$\begin{aligned} kp(k) &= kp(k-1) - \sigma \frac{\partial J(k)}{\partial Kp(k)} \\ &= kp(k-1) + 2\sigma \cdot \xi(k) \cdot e(k) \end{aligned} \qquad (8)$$

where σ denotes learning gain.

The amount of calculation by the equation (8) is extremely smaller in comparison with the equations (5) and (6), by which real time calculation becomes possible. On the other hand, estimation accuracy and/or estimation speed might deteriorate slightly.

Figure 8:
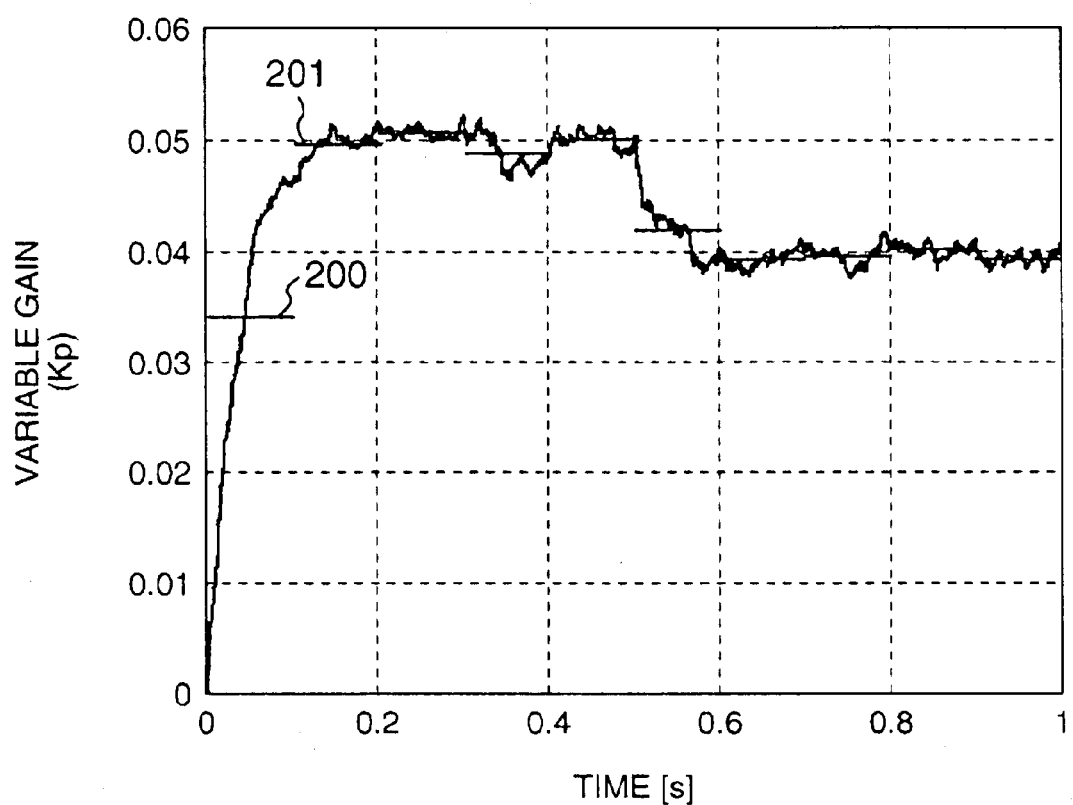
FIG. 8 is a graph showing time response of gain estimation result of the fine-movement actuator in accordance with the second embodiment.

An estimation result of the gain of the fine-movement actuator by use of the equation (8) is shown in FIG. 8 in order to examine the effectiveness of the second embodiment. As shown in FIG. 8, the variable gain kp converged on the true value 0.05 in approximately 0.1 sec. The convergence speed is slower than that in the estimation result of the first embodiment (FIG. 6B) employing the least-squares method; however, no problem particularly arises when variation of the fine-movement actuator with time is estimated. The latter part of FIG. 8 from 0.5 sec indicates the response when the gain of the fine-movement actuator was intentionally changed from 0.05 to 0.04, in which accuracy of the estimation can be seen. Incidentally, the lines 200, 201, etc. drawn in FIG. 8 at intervals of 0.1 sec indicate the mean values of the estimate in each interval. By obtaining the mean value from the estimation result and comparing gain deterioration (gain drop) of the fine-movement actuator with the mean value, the reliability of the estimation can be improved further.

Figure 9:
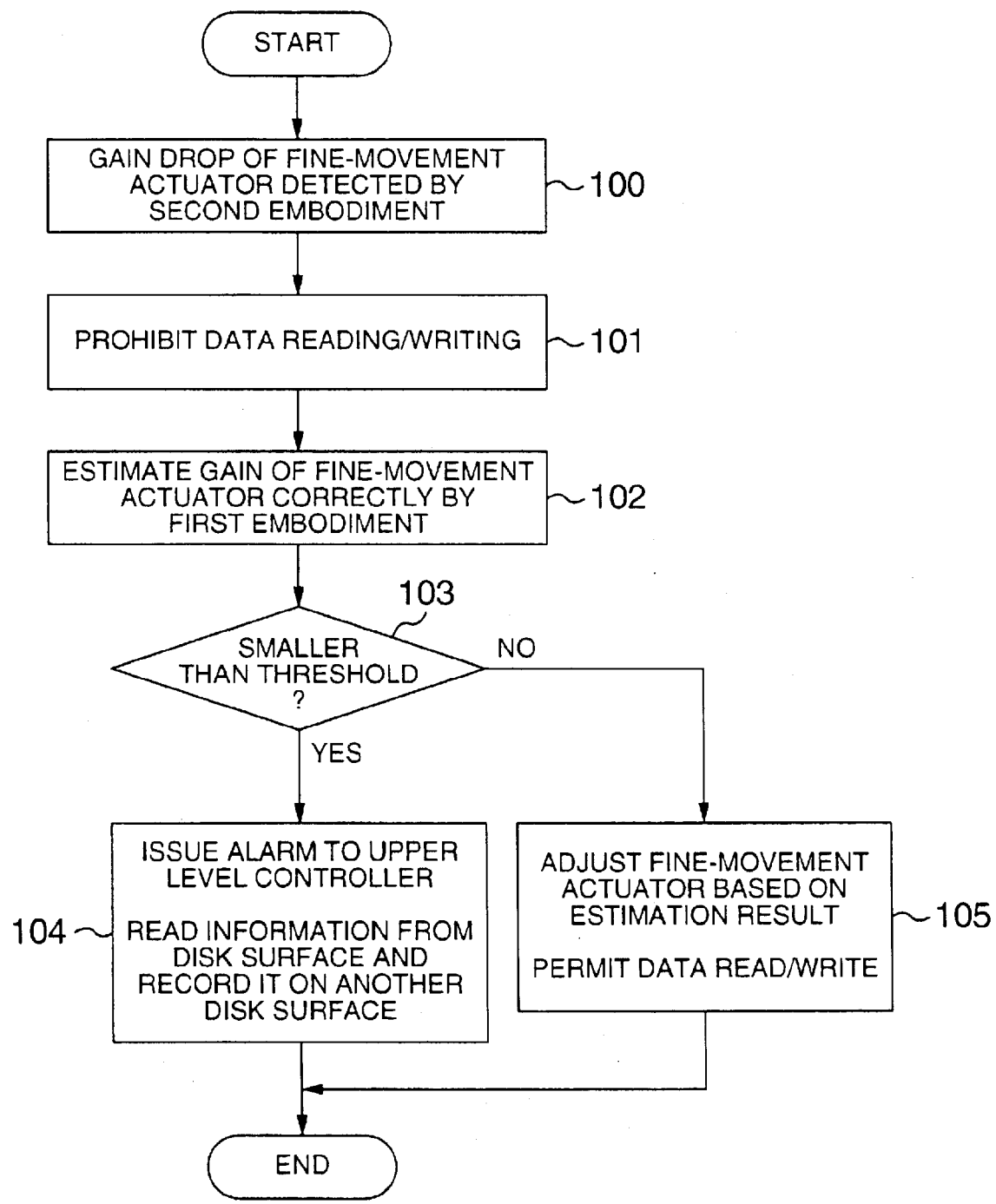
FIG. 9 is a flow chart showing a process which is carried out when gain drop of the fine-movement actuator is detected by the gain estimation according to the second embodiment.

FIG. 9 is a flow chart showing a process which is carried out when the gain drop of the fine-movement actuator is detected by the estimation according to the second embodiment. When a gain drop below a preset threshold value is detected (step S100), data reading/writing by the head is prohibited (step S101) and thereafter the gain of the fine-movement actuator is estimated correctly according to the first embodiment (step S102). Subsequently, the estimate obtained by the first embodiment is compared with the threshold value (step S103). If the estimate is larger than or equal to the threshold value ("NO" in the step S103), the fine-movement actuator is adjusted based on the estimation result and thereafter a flag permitting the data read/write is turned on (step S105), by which the two-stage actuator returns to its normal state. For example, when the gain of the fine-movement actuator deteriorated, the state can be improved by increasing the gain of the fine-movement controller. On the other hand, if the estimate is smaller than the threshold value ("YES" in the step S103), an alarm is issued to the upper level controller, and data that has been recorded on the disk surface (by use of the fine-movement actuator whose gain dropped) is read out and the data is recorded on another disk surface (step S104). In such cases of gain drop below the threshold value, data reading/writing might become impossible, and there is a possibility of failure of the fine-movement actuator caused by some factors. By the present invention, it becomes possible to exclude such factors and improve the reliability of the disk storage drive.

While the present invention has been made for estimating the gain of the fine-movement actuator, when the fine-movement actuator is not driven, the loop gain of the coarse-movement actuator can also be estimated by use of the algorithm of the adaptive identification unit of the present invention. Such estimation can be carried out by removing the notch filter 48 from the coarse-movement loop shown in FIG. 1, applying a sine wave as the target value 46, and input the control input Uv and the head position signal Y to the adaptive identification unit. By using the same algorithm for both loops, the amount of necessary software can be reduced.

Incidentally, while a magnetic disk unit has been taken as an example in the above embodiments, the present invention can also be applied to other types of disk storage drives for optical disks, DVD-RAMs, etc. Optical disk units, DVD recorders, etc. generally include a coarse-movement actuator and a fine-movement actuator as in the above embodiments, to which the first and second embodiments of the present invention can be applied suitably and effectively. Of course, the present invention can also be applied similarly to a positioning control device for controlling two or more two-stage actuators.

While the fine-movement actuator was assumed to be piezoelectric elements in the above embodiments, the application of the present invention is not restricted to particular types of fine-movement actuators. Therefore, the present invention is implementable even if the fine-movement actuator (piezoelectric actuator) is replaced with an electromagnetic actuator, electrostatic actuator, etc.

Further, the present invention is also applicable to a three-stage actuator having a coarse-movement actuator, a fine-movement actuator and a superfine-movement actuator whose weight and response is still lighter and faster, by replacing the coarse-movement actuator and fine-movement actuator of the above embodiments with fine-movement actuator and super fine-movement actuator of the three-stage actuator, respectively. Therefore, the application of the present invention is not restricted by the number of actuators.

In addition, while the above embodiments have been described with concrete numerical values, the present invention is not to be restricted by the figures.

As set forth hereinabove, by the present invention, in a positioning control device for a two-stage actuator having a fine-movement actuator of high response and short stroke and a coarse-movement actuator of low response long stroke, an adaptive identification unit capable of estimating the input-output characteristics of the fine-movement actuator at high speed and with high accuracy can be realized. Further, an adaptive identification unit, capable of estimating the input-output characteristics of the fine-movement actuator and thereby monitoring the gain deterioration etc. of the fine-movement actuator even in the midst of data reading/writing by the head, can be implemented. By the present invention, the controller of the fine-movement actuator can be adjusted or redesigned properly based on the gain of the fine-movement actuator estimated with high accuracy, by which high-precision head positioning control can be attained. The high-precision positioning control allows smaller track width (track interval) and higher data density per disk surface, thereby higher storage capacity of the disk storage drive can be realized. Further, since the gain deterioration of the fine-movement actuator can be detected, necessary action or steps can be taken properly and immediately, by which the reliability of the device can be increased.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A positioning control device for a two-stage actuator having a fine-movement actuator for supporting and positioning a head which reads or writes information from/to a disk and a coarse-movement actuator for positioning the fine-movement actuator which is mounted thereon, comprising coarse-movement control means which controls the coarse-movement actuator based on a head position signal which is obtained from information read out by the head, wherein:

the positioning control device further comprises:
    a notch filter having a cutoff frequency fn which is provided to the coarse-movement control means;
    target value generation means which outputs instruction values for driving the fine-movement actuator at the frequency fn; and
    adaptive identification means which estimates the gain of the fine-movement actuator from an actuating signal to the fine-movement actuator and the head position signal.

2. The positioning control device for a two-stage actuator according to claim 1, wherein the adaptive identification means is implemented by:
    an identification model indicating characteristics of the fine-movement actuator;
    a variable gain indicating gain of the fine-movement actuator to be estimated;
    an identification model output signal as the product of the identification model and the variable gain; and
    adaptive control means which controls the variable gain so as to reduce the deviation of the identification model output signal from the head position signal.

3. The positioning control device for a two-stage actuator according to claim 1, wherein the instruction values for driving the fine-movement actuator at the frequency fn are target values forming a sine wave.

4. A positioning control device for a two-stage actuator having a fine-movement actuator for supporting and positioning a head which reads or writes information from/to a disk and a coarse-movement actuator for positioning the fine-movement actuator which is mounted thereon, comprising coarse-movement control means which controls the coarse-movement actuator based on a head position signal which is obtained from information read out by the head, wherein:

the positioning control device estimates the gain of the fine-movement actuator from an actuating signal to the fine-movement actuator and the head position signal in a state in which a response waveform of the head position signal coincides with a response waveform of the fine-movement actuator.

5. A positioning control device for a two-stage actuator having a fine-movement actuator for supporting and positioning a head which reads or writes information from/to a disk and a coarse-movement actuator for positioning the fine-movement actuator which is mounted thereon, comprising control means which controls the fine-movement actuator and the coarse-movement actuator based on a head position signal which is obtained from information read out by the head, wherein:

the positioning control device further comprises adaptive identification means which employs: a coarse-movement identification model for estimating the position of the coarse-movement actuator based on control input to the coarse-movement actuator and a model of the coarse-movement actuator; and an estimated position signal regarding the fine-movement actuator that is obtained by subtracting the output of the coarse-movement identification model from the head position signal, and thereby estimates the gain of the fine-movement actuator from control input to the fine-movement actuator and the estimated position signal regarding the fine-movement actuator.

6. The positioning control device for a two-stage actuator according to claim 1, wherein the information writing to the disk by the head is prohibited if the gain of the fine-movement actuator estimated by the adaptive identification means became lower than a preset value.

7. The positioning control device for a two-stage actuate or according to claim 5, wherein the information writing to the disk by the head is prohibited if the gain of the fine-movement actuator estimated by the adaptive identification means became lower than a preset value.

8. The positioning control device for a two-stage actuator according to claim 1, wherein control means for the fine-movement actuator is adjusted based on the gain of the fine-movement actuator estimated by the adaptive identification means.

9. The positioning control device for a two-stage actuator according to claim 5, wherein the control means for the fine-movement actuator is adjusted based on the gain of the fine-movement actuator estimated by the adaptive identification means.

* * * * *